United States Patent [19]

Bogaerts et al.

[11] Patent Number: 4,867,021

[45] Date of Patent: Sep. 19, 1989

[54] TOOL BAR ASSEMBLY

[75] Inventors: Leo C. Bogaerts, Antioch; John W. Murphy; John S. Norman, both of Waukegan, all of Ill.

[73] Assignee: Ammco Tools, Inc., North Chicago, Ill.

[21] Appl. No.: 126,122

[22] Filed: Nov. 27, 1987

[51] Int. Cl.[4] .......................... B23B 3/22; B23P 15/28; B26D 1/00

[52] U.S. Cl. ........................................ 82/112; 82/123; 407/71; 407/109

[58] Field of Search ...................... 86/36 R, 4 A, 2 A; 407/67, 70, 71, 74, 76, 103, 104, 109

[56] References Cited

U.S. PATENT DOCUMENTS

| | | | |
|---|---|---|---|
| 1,327,410 | 1/1920 | Simeone | 407/70 |
| 3,207,015 | 9/1965 | Ditto | 407/74 X |
| 3,765,280 | 10/1973 | Phillips | 407/67 X |
| 3,815,454 | 6/1974 | Knott | 82/36 R |
| 4,151,766 | 5/1979 | Eichenhofer | 82/4 A |
| 4,510,828 | 4/1985 | Bogaerts et al. | 82/25 X |

Primary Examiner—Eugene R. LaRoche
Assistant Examiner—Nathan W. McCutcheon
Attorney, Agent, or Firm—Edmond T. Patnaude

[57] ABSTRACT

A boring bar assembly having a symmetrical carbide tip holder for turning a brake drum and which can be rotated 180 degrees for facing either or both sides of a rotor of a disc brake. A hexagonal bar provides a housing for receiving a depth of cut mechanism including a dial at one end of the bar. A movable dial rod is connected to the dial mechanism and extends through the housing and engages a tool bit holder at the other end of the bar. A carbide tip is positioned and clamped in one of two undercut pockets on opposite sides of the flat head of the bit holder. The holder includes an angular surface engaging the dial rod so that the holder is moved toward and away from the axis of the housing in response to the dial rod. A spring-loaded tool retractor is provided in a bore of the housing and includes an angular end surface which is yieldably urged against a portion of the angular surface of the holder. When the dial rod is retracted and moved away from the holder, the end surface of the retractor slides along the angular surface of and into the holder which retracts the holder toward the axis of the housing.

10 Claims, 2 Drawing Sheets

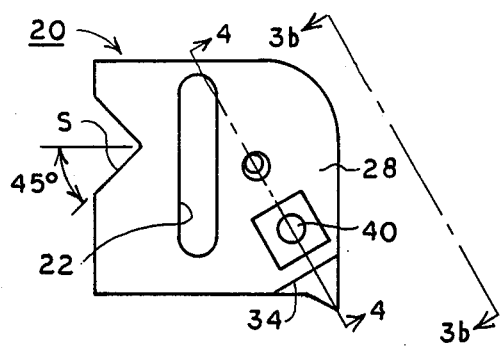
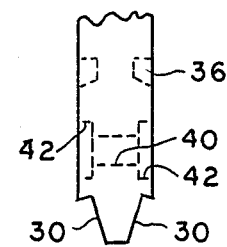
FIG. 3a  FIG. 3b
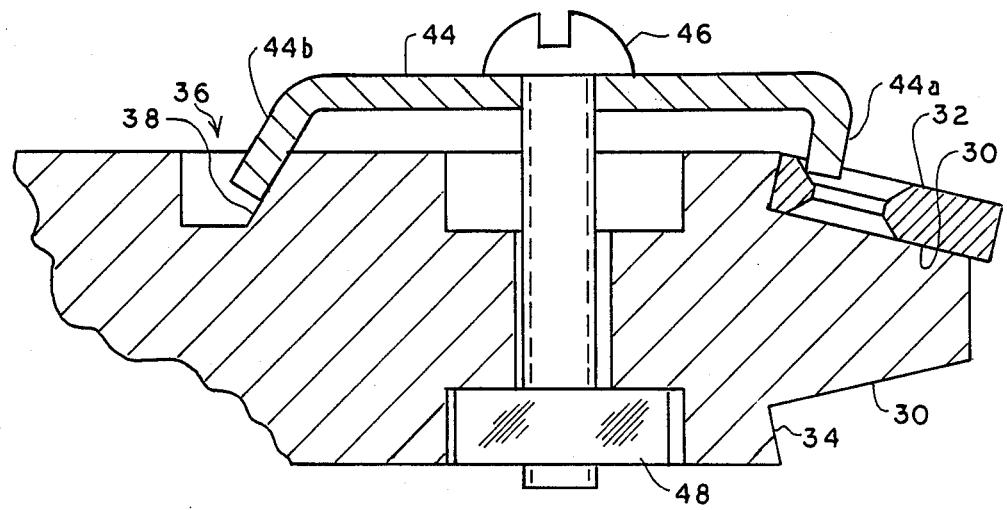
FIG. 4
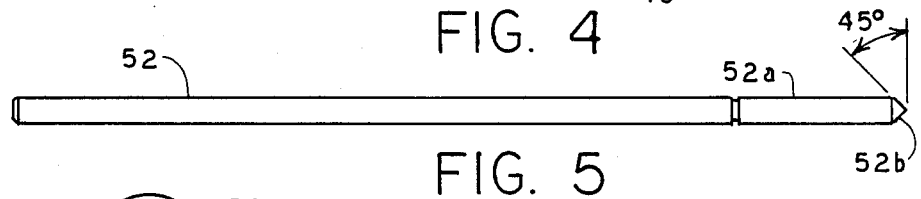
FIG. 5
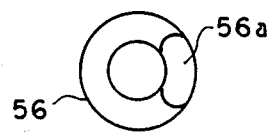
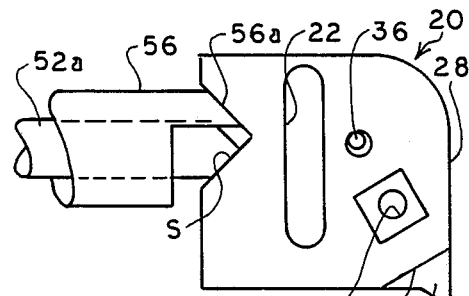
FIG. 6a
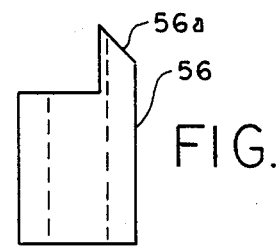
FIG. 6b  FIG. 7

TOOL BAR ASSEMBLY

BACKGROUND OF THE INVENTION

This invention relates to a tool bar assembly for advancing a cutting bit into a workpiece, and, more particularly to such an assembly for use with a lathe for resurfacing brake drums and disc brake rotors.

Tool assemblies for servicing the brakes on vehicles for resurfacing, in the case of disc brakes, both sides of the rotor to maintain parallelism between the surfaces, and, in the case of drum brakes, to turn the inner surface of the drum so as to maintain a brake surface concentric with the drum rotational axis, are known and have been widely used in the art. Such assemblies are disclosed, for example, in U.S. Pat. No. 4,510,828 which is assigned to the same assignee as the present invention. These tool assemblies generally comprise a bar having a depth-of-cut mechanism at one end thereof and a cutting bit mounting at the other end thereof. The bar is fixedly mounted to a moving member of the lathe so that the cutting bit of the tool assembly can be advanced along the disc brake rotor, or a drum, which is rotatably mounted on the lathe. These tool assemblies have the disadvantage that they generally are dedicated for only one of either right-hand or left-hand use in both the drum turning and rotor facing applications. Thus, the dedicated tool assemblies are not reversible so as to provide alternate tool assembly positions.

These and other disadvantages are overcome by the present invention wherein there is provided a tool assembly having a symmetrical cutting tip holder wherein by revolving the tool bar or body by 180 degrees, the tool assembly can be used both as a right-hand or a left-hand tool assembly.

SUMMARY OF THE INVENTION

Briefly, a tool bar assembly is provided. The assembly includes a longitudinally extending tool bar housing having an adjusting member slidably mounted therein and extending therethrough. A depth-of-cut mechanism including a dial is mounted at one end of the housing and engages one end of the adjusting member. A tool bit holder is slidably mounted at the other end of the housing for movement toward and away from the longitudinal axis of the housing. Means are provided for moving the holder toward and away from the axis of the housing in response to the longitudinal movement of the adjusting member. A tool bit tip is mounted on the holder.

BRIEF DESCRIPTION OF THE DRAWING

The advantages of this invention will become more readily appreciated as the same becomes completely understood by reference to the following detailed description when taken in conjunction with the accompanying drawing wherein:

FIGS. 3a and 3b are plan and end views, respectively, of the tool holder illustrated in FIGS. 1 and 2;

FIG. 4 is a partial cross-sectional view of the holder illustrated in FIG. 3a and taken along the line 4—4 thereof;

FIG. 5 is a plan view of the dial rod assembly which is utilized to advance the cutter bit into the work piece;

FIGS. 6a and 6b are end and plan views of a tubular sleeve member which cooperates with the dial rod of FIG. 5 to advance the cutter bit into the work piece; and, FIG. 7 is a partial plan view of the dial rod of FIG. 5 and a tubular sleeve of FIG. 6b and which illustrates the cooperation of these elements with the tool holder of FIG. 3a to control the position of the cutter tip.

DETAILED DESCRIPTION

Figure 1:
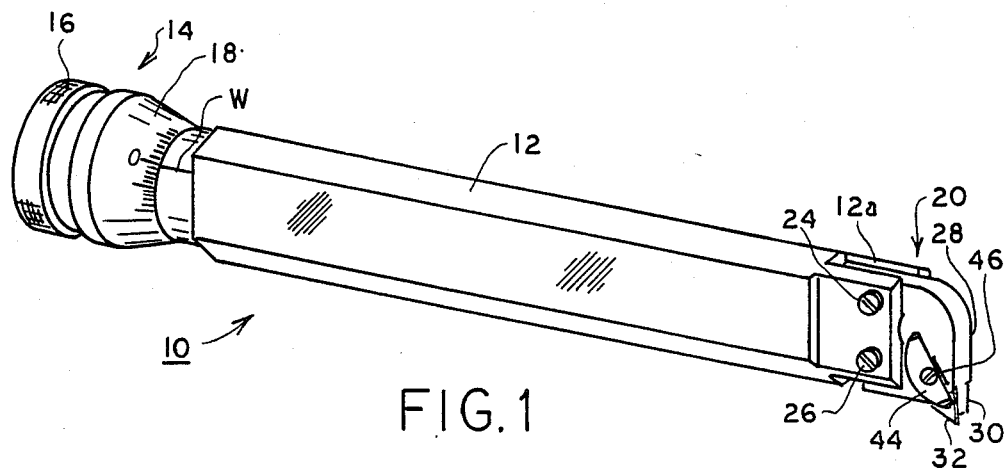
FIG. 1 is a perspective view of a preferred embodiment of the tool assembly in accordance with the principles of the present invention.

Referring now to FIG. 1, there is shown generally at 10 a tool bar assembly in accordance with the present invention. Tool bar assembly 10 includes a hexagonal body 12 which facilitates mounting tool assembly 10 to a lathe or any other utilization device. Tool assembly 10 includes a depth-of-cut mechanism shown generally at 14 which includes a rotatable dial 16. Dial 16 is rigidly attached to a dial rod (FIG. 5) which is rotatably mounted within a bore extending through hexagonal bar 12 for engaging a tool holder as will be explained more fully hereinafter. Depth-of-cut mechanism 14 includes a micrometer dial 18 which is engaged and rotated by dial 16. Micrometer dial 18 is spring loaded within the assembly so that the "zero" marking thereon can be adjusted to be initially aligned with witness line W and which is thereafter rotatably connected to dial 16. The other end of tool bar assembly 10 includes a tool holder shown generally at 20. Tool holder 20 is slidably mounted within a slotted end portion 12a of tool assembly 10 for movement toward and away from the longitudinal axis of tool bar assembly 10 in response to the engagement of the dial rod with an angular surface S of tool holder 20 as best illustrated in FIG. 3a.

Referring now to FIG. 3a in conjunction with FIG. 1, it can be seen that tool holder 20 includes a slotted portion 22 which constrains and retains holder 20 within the slotted end portion of tool bar assembly 10 by means of fasteners 24 and 26. Tool holder 20 includes a body portion 28 and undercut pockets 30 as best illustrated in FIG. 3b. One of pockets 30 is selected to receive a cutter tip 32 which abuts a locating shoulder or stop 34 at the inward end portion of pocket 30. As best illustrated in FIGS. 3a and 3b, body portion 28 of tool holder 20 is further provided with a retaining portion 36 which includes an inclined surface 38 which faces in the direction away from the mounting surface or pocket 30 of tool holder 20. Finally, tool holder 20 is provided with a throughbore 40 having counterbore end portions 42.

Referring again to FIG. 1 it can be seen that cutter tip 32 is retained within pocket 30 by means of a spring clip 44 which is fixedly fastened to body portion 28 of tool holder 20 by means of a threaded fastener 46 which extends through bore 40 and threadedly engages a second threaded fastener or nut 48. Spring clip 44 includes a first bent edge portion 44a which engages cutter tip 32. Spring clip 44 further includes a second bent edge portion 44b which is provided of a mating angle to inclined surface 38 of retaining portion 36 in complementary relationship therewith. The function and operation of the foregoing spring clip mounting technique is described in greater detail in the co-pending application of Leo Bogaerts entitled "Mounting Arrangement for a Cutter Bit" filed even date herewith.

Figure 2:
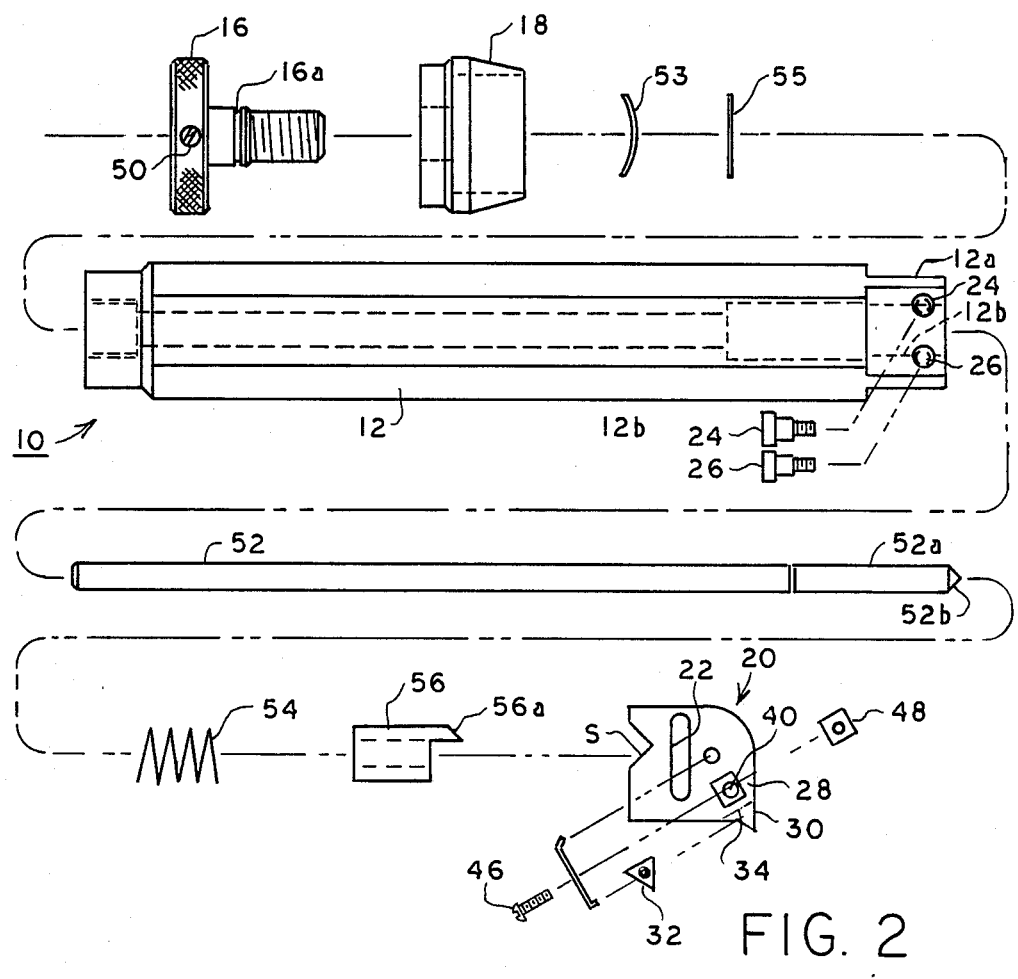
FIG. 2 is an exploded view of the tool assembly of FIG. 1 illustrating in greater detail the component parts of the illustrated preferred embodiment.

Referring now to FIG. 2 there is shown an exploded view of the tool assembly 10 of FIG. 1. It can be seen that dial 16 includes a threaded fastener 50 which engages and rigidly attaches a dial rod 52 which is inserted into a coaxial bore provided in dial 16. Tool assembly 10 includes a spring washer 53 and a retaining ring 55 to latter of which is received within a groove 16a of dial 16 when the component parts are assembled. Thus, spring washer 54 allows micrometer dial 18 to be rotated relative to dial 16 so as to align the "zero" marking on dial 18 with witness line W. Thereafter, rotation of dial 16 results in a corresponding rotation of dial 18 to indicate the relative depth of the cut during the facing and turning operations. The leading end 52a of dial rod 52 is extended through a retractor spring 54 and a tubular retractor sleeve member 56 and, once assembled, end portion 52a pilots in retractor sleeve 56 and engages angular surface S of tool holder 20. Retractor spring 54 is received within a cylindrical bore 12b of hexagonal body 12 adjacent to and extending through the slotted end portion 12a thereof.

It can be seen that the leading edge of tubular sleeve 56 is provided with a inclined surface 56a which corresponds to angular surface S of tool holder 20 in complementary relationship therewith. Referring again to FIG. 4 it can be seen that pockets 30 are provided on opposite sides of tool holder 20 and are symmetrically disposed about the longitudinal axis of tool holder 20. Thus, in actual operation, tool assembly 10 can be rotated 180 degrees and carbide tip 32 can be mounted in the alternate pocket 30 so as to provide a leading edge extending in the proper direction for engaging the workpiece. Thus, tool assembly 10, in accordance with the principles of the present invention, can provide both a left-hand tool and a right-hand tool to meet the needs of a given application.

Referring now to FIG. 7, a further feature of the present invention will now be described. Retractor spring 54 yieldably biases retractor sleeve 56 into engagement with the sloped surface S of tool holder 20. When dial rod 52 is backed away from tool holder 20 in response to counter-clockwise rotation of dial 16, surface 56a of sleeve 56 rides along upper surface S of tool holder 20 thereby translating tool holder 20 towards the longitudinal axis of tool assembly 10 and away from the workpiece. Conversely, when dial rod 52 is advanced towards tool holder 20, the lower sloped surface S of tool holder 20 rides along the surface 52b of dial rod 52 in response to clockwise rotation of dial 16 of depth-of-cut mechanism 14, thus advancing dial rod 52 into engagement with tool holder 20 moves tool holder 20 and cutter tip 32 into operative engagement with the workpiece. As dial rod 52 advances tool holder 20 away from the longitudinal axis of tool assembly 10, the corresponding inclined surface S of tool holder 20 forces retractor sleeve 56 against spring 54 back into cylindrical bore 12b. Since the movement of tool holder 20 is constrained by slotted portion 22 in cooperation with fasteners 24 and 26, tool holder 20 is limited to translation toward and away from the longitudinal axis of tool assembly 10. It will be appreciated by those skilled in the art that tool assembly 10, in accordance with another feature of the present invention, provides a movable and therefore continuously adjustable tool holder which is not fixedly mounted to the body of the tool assembly as in the prior art tool assemblies.

What has been taught, then, is a tool bar assembly facilitating, notably, reversible operation and a movably mounted tool holder and which overcomes the disadvantages of the prior art. The form of the invention illustrated and described herein is but a preferred embodiment of these teachings. It is shown as an illustration of the inventive concepts, however, rather than by way of limitation, and it is pointed out that various modifications and alternations may be indulged in within the scope of the appended claims.

What is claimed is:

1. A boring bar assembly comprising, in combination,
   a longitudinally extending, elongate boring bar housing having a dial rod slidably mounted therein and extending therethrough along the longitudinal axis of said housing;
   a depth of cut mechanism including a dial mounted at one end of said housing and engaging one end of said dial rod;
   a tool bit holder slidably mounted at the other end of said housing for movement toward and away from the longitudinal axis of said housing, said holder having a generally flattened head portion with undercut pocket portions on opposite sides of said head portion and said holder having a tapered surface thereon facing the other end of said dial rod for moving said holder toward and away from said axis in response to the longitudinal movement of said dial rod; and
   a tool bit tip mounted in one of said pockets and extending away from said head.

2. The boring bar assembly according to claim 1, wherein said holder is slidably mounted in a transverse slotted portion of said housing at said other end.

3. The boring bar assembly according to claim 2, including a retractor mounted in an opening of said housing at said other end and being resiliently urged against said holder, said retractor having a tapered edge projection engaging a portion of said tapered surface of said holder.

4. The boring bar assembly according to claim 3, wherein said tapered edge portion engages said tapered surface of said holder in complementary relationship therewith.

5. The boring bar assembly according to claim 4, wherein said retractor is a generally tubular member coaxially and slidably mounted about said dial rod and wherein said projection projects away from an annular edge portion of said tubular member.

6. The boring bar assembly according to claim 5, wherein said tapered surface of said holder comprises a generally V-shaped cutout portion along an inner edge of said holder, and wherein the leg portions of said V-shaped cutout portions respectively engage said dial rod and said projection.

7. The boring bar assembly according to claim 1, wherein said housing is hexagonal in cross section.

8. The boring bar assembly according to claim 7, wherein said dial rod is cylindrical and is circular in cross section.

9. A boring bar assembly comprising, in combination,
   a longitudinally extending boring bar housing having a dial rod sliding mounted therein and extending therethrough;
   a depth of cut mechanism including a dial mounted at one end of said housing and engaging one end of said dial rod;

a tool bit holder slidably mounted in a transverse slotted portion at the other end of said housing for movement toward and away from the longitudinal axis of said housing, said holder having a generally flattened head portion with undercut pocket portions on opposite sides of said head portion and said holder having a tapered surface thereon facing the other end of said dial rod for moving said holder toward and away from said axis in response to the longitudinal movement of said dial rod;

a tool bit mounted in one of said pockets and extending away from said head, and a retractor mounted in an opening of said housing at said other end and being resiliently urged against said holder, said retractor having a tapered edge projection engaging a portion of said tapered surface of said holder.

10. A tool bar assembly comprising, in combination, a longitudinally extending tool bar housing having an adjusting member slidably mounted therein and extending therethrough;

a depth-of cut mechanism including a dial mounted at one end of said housing and engaging one end of said adjusting member;

a tool bit holder slidably mounted at the other end of said housing for movement toward and away from the longitudinal axis of said housing;

means for moving said holder toward and away from said axis in response to the longitudinal movement of said adjusting member; and a tool bit tip mounted on said holder, said holder including undercut pocket portions symmetrically provided on opposite sides of said holder and wherein said tool bit tip is mounted in one of said pockets.

* * * * *